United States Patent [19]

Panza

[11] 4,150,313
[45] Apr. 17, 1979

[54] SILENCER FOR AN INTERNALLY-VENTILATED ELECTRIC MOTOR

[75] Inventor: Michael J. Panza, Erie, Pa.

[73] Assignee: Lord Corporation, Erie, Pa.

[21] Appl. No.: 816,222

[22] Filed: Jul. 15, 1977

[51] Int. Cl.² .............................................. H02K 5/24
[52] U.S. Cl. ......................................... 310/51; 310/62
[58] Field of Search ....................... 310/88, 89, 62, 63, 310/58, 57, 66

[56] References Cited

U.S. PATENT DOCUMENTS

| | | | |
|---|---|---|---|
| 2,179,341 | 11/1939 | Muller | 310/63 |
| 2,508,144 | 5/1950 | Carville | 310/63 |
| 2,522,675 | 9/1950 | Hoover | 310/62 |
| 2,697,179 | 12/1954 | Wendel | 310/62 |
| 2,881,337 | 4/1959 | Wall | 310/51 X |
| 3,575,524 | 4/1971 | Adjian | 310/62 X |
| 3,980,912 | 9/1976 | Panza | 310/51 |

FOREIGN PATENT DOCUMENTS 1146581 7/1961 Fed. Rep. of Germany .............. 310/62

*Primary Examiner*—Mark O. Budd
*Attorney, Agent, or Firm*—Maurice R. Salada; James W. Wright

[57] ABSTRACT

An electric motor includes a motor frame and a fan driven by the motor disposed adjacent one end of and inside the motor frame. The fan draws air in through an inlet opening formed in the motor frame at the end of the frame opposite the fan. The air flows over and cools internal components of the motor and is exhausted by the fan in a radially outward direction through an outlet opening in the motor frame. A silencer for the motor includes an acoustical panel which at least partially surrounds the motor frame, is spaced from the frame, and is disposed to intercept air flowing radially from the outlet opening in the frame. The acoustical panel extends from the fan end of the motor frame partway along the length of the frame so as to direct air exhausted from the fan along the frame between the frame and the panel. The panel includes a layer of air-permeable sound absorbing material and air-impermeable sheet disposed adjacent to the sound absorbing material on the side of the material opposite the motor frame. A perforated sheet is disposed between the sound absorbing material and the motor frame. In a direct current electric motor that operates at any one of several speeds, the noise which is produced by the motor and which is emitted from the motor with the air that passes through the outlet opening in the motor frame may be characterized by a dominant pure tone that varies with the rotational speed of the fan and motor. In such a motor, the perforated sheet and the air-impermeable sheet of the acoustical panel are preferably spaced relative to each other and to the motor frame such that the two sheets define at least part of a resonant cavity tuned to the dominant pure tone produced by the air exhausted from the fan at the maximum rotational speed of the motor. By so tuning the resonant cavity, the sound absorbing material of the acoustical panel can effectively be utilized to attenuate the noise generated at other rotational speeds of the fan and motor.

6 Claims, 5 Drawing Figures

SILENCER FOR AN INTERNALLY-VENTILATED ELECTRIC MOTOR

BACKGROUND OF THE INVENTION

Some electrical motors for industrial use have a housing or frame that totally encloses the motor winding and armature areas. The housing or frame protects the interior components of the electric motor when it is exposed to environments contaminated with moisture or dust, for example. At the same time, the total enclosure provided by the frame necessitates a cooling fan and specially designed surfaces on the frame to dissipate the heat transmitted to the frame by the electrodynamically operating components of the motor. In one typical construction of such a fan cooled, totally enclosed electric motor, the motor frame is generally cylindrical and the fan is mounted at the end of the frame opposite the main drive shaft from the motor. For safety and to ensure proper air flow, a cup-like cap or bell is fitted over the fan and the adjacent end of the motor frame. The fan draws air in through a grille in the center of the cap and exhausts the air in a radial direction. The cap directs the air from the fan along the length of the motor frame between the frame and the sides of the cap. A number of fins project from and extend lengthwise along the motor frame to improve the cooling of the motor frame by the air flow. As should be apparent, air must flow along and adjacent to the exterior of the motor frame to cool a totally enclosed electric motor.

As the fan blades of a totally enclosed, fan cooled motor rotate to produce a flow of cooling air, the noise emanating from the motor increases beyond the level normally generated by the motor itself. The additional noise is caused by air flowing through the various passages about the motor frame and by the movement of the fan blades. To maintain the noise level within acceptable limits, both the fan inlet and outlet for a totally enclosed, fan cooled electric motor can be fitted with a silencer. A typical inlet silencer is a cylindrical member incorporating sound absorbing material and mounted to extend axially away from the fan inlet. Air is drawn into the silencer either axially or radially and then flows axially through the silencer to the fan. Another type of inlet silencer is simply a circular disc-like member that incorporates sound absorbing material and is mounted in front of the fan inlet. Air is drawn into the fan radially along the silencer to attenuate noise. One type of outlet silencer for a totally enclosed, fan cooled electric motor includes an acoustical panel configured to define an open-ended member that at least partially surrounds the motor frame. The silencer is mounted adjacent the free end of the air-directing cap or bell that fits over the fan. Thus, the air that is directed by the cap along the length of the motor frame and along the cooling fins on the frame also passes between the acoustical panel and the frame so as to provide noise attenuation. Totally enclosed, fan cooled electric motors with inlet and outlet silencers are described and illustrated in Panza U.S. Pat. No. 3,980,912 and German published application (Offenlegungs-schrift) No. 2,000,236.

Although totally enclosed, fan cooled electric motors are adequately cooled without being internally exposed to contaminants such as dust and water, for example, other electric motors are constructed to provide a flow of cooling air through the interiors of the motors. An internally ventilated electric motor typically has a fan located within the motor frame so to draw air in through an inlet adjacent one end of the frame and exhaust the air through an outlet adjacent the other end of the frame. To prevent dust and water from entering the motor frame, the inlet opening is often covered with a filter. Since the cooling air flows through the motor frame and directly over the internal components of the motor, there is no need to direct air axially along the outside surface of the motor frame. One such internally ventilated, fan cooled electric motor is shown in FIG. 1 of Landberg et al U.S. Pat. No. 3,213,304. A common use of internally ventilated, fan cooled electric motors is as drive or traction motors for the wheels of transit cars used in urban subway systems, for example. When mounted in a truck for a transit car, an internally ventilated, fan cooled electric motor is usually oriented to extend across the truck and across the track on which the truck travels. The output end of the drive shaft from the motor engages a gear box that is adjacent to and often contiguous with the end of the motor frame. Because of the tight fit of the motor between the side frames of the truck, and because of the proximity of the gear box to at least one end of the motor frame, it is not generally feasible to provide a flow of air through the motor by way of inlet and outlet openings formed in the ends of the motor frame. Instead, the inlet and outlet openings are formed adjacent the ends of the motor frame in the curved circumferential surface of the motor frame.

As increasingly stringent controls have been imposed by government statutes and/or regulations on the noise produced in urban areas, in particular, it has become necessary to silence the internally ventilated, fan cooled electric motors that are used in transit cars. The design of a silencer for a transit car motor offers special problems because of the extremely limited space available for the silencers. The electric motor itself is already tightly fitted in between the two side frames of the transit car truck. Minimum clearances must be maintained between the truck and the track or track bed and between the truck and the body of the transit car. Consequently, a silencer for a transit car motor cannot increase the external dimensions of the motor to any significant extent. In addition, a drive motor for a transit car is typically a direct current motor that has an operating speed range which varies directly with the speed of the transit car. As the transit car speeds up or slows down or travels at different constant speeds, the direct current electric motor also speeds up, slows down, and operates at different speeds. At each different operating speed of the motor, it generates a different noise spectrum. Since no one noise spectrum predominates, all of the noise spectra generated by the motor must be attenuated by a silencer for the motor. The problem of silencing a multiple speed, direct current motor is quite different from the problem of silencing an alternating current electric motor that has a single normal operating speed. An alternating current electric motor may initially run through numerous operating speeds in order to attain its normal operating speed, thereby generating a multiplicity of noise spectra associated with the various operating speeds through which the motor initially passes. Nonetheless, the motor will rotate predominately at a single speed and generate a single noise spectrum. A silencer for such an alternating current motor may thus be designed to attenuate just the noise spectrum generated at the normal operating speed of the motor. No significant consideration need be given to the other noise spectra that are generated by the motor as it speeds up from stop to its normal operating speed or slows down from its normal operating speed to a full stop.

SUMMARY OF THE INVENTION

The present invention relates to a compact silencer for an internally ventilated, fan cooled electric motor which effectively attenuates the noise generated by the internal cooling fan for the motor. The silencer can be utilized on existing internally ventilated, fan cooled electric motors without modifying their basic structure. An internally ventilated, fan cooled electric motor with which the invention is to be used has a motor frame and a fan driven by the motor. The fan is disposed adjacent one end of and inside the motor frame. Air is drawn by the fan into the motor frame through an inlet opening formed in the frame adjacent the end of the frame opposite the fan. The air flows over and cools the internal components of the motor and is exhausted by the fan in a radially outward direction through an outlet opening in the motor frame. A silencer according to the present invention includes an acoustical panel that at least partially surrounds the motor frame. The panel is spaced from the frame and is disposed adjacent the outlet opening in the frame so as to intercept air flowing radially from the fan and the outlet opening. The panel extends from adjacent the fan end of the motor frame at least partway along the length of the frame toward the fan inlet so as to direct air exhausted from the fan along the length of the frame between the frame and the panel. The acoustical panel includes a layer of air-permeable sound absorbing material and an air-impermeable sheet disposed adjacent to the sound absorbing material on a side of the material opposite the motor frame. A perforated sheet is disposed between the sound absorbing material and the frame.

The silencer of the present invention provides a significant degree of noise attenuation without a significant increase in the outer dimensions of the motor on which the silencer is mounted. The axial or lengthwise orientation of the silencer with respect to the motor frame minimizes the increase in the apparent outer diameter of the motor. The apparent length of the motor need not change at all. At the same time, the airborne noise emanating from the motor will have extended contact with the acoustical panel of the silencer as the air from the fan exhaust travels along the motor frame. The silencing will be particularly effective for a smooth surfaced motor frame, inasmuch as the air from the fan exhaust and the associated airborne noise will tend to travel in helical paths along and about the surface of the motor frame rather than travelling in a straight line along the length of the frame. The helical paths of travel of the air and airborne noise from the motor will further increase the effective length of the silencer. Although the axial orientation of the silencer resembles the orientation of exhaust silencers for totally enclosed, fan cooled electric motors, the orientation of the silencer of the present invention is not dictated by the need to direct cooling air along the exterior of the housing frame. The axial orientation of the present silencer redirects a fan exhaust to achieve maximum noise attenuation with minimum size of the silencer.

Because it incorporates sound absorbing material, the silencer of the invention will be effective to some extent at most frequencies within the audible frequency range. Nonetheless, the silencer will be most effective and efficient if constructed to meet the operating characteristics of each particular motor. For example, due to the proximity between the fan blades and the motor frame of at least one type of multiple speed, direct current motor, the motor generates noise which is emitted through the outlet opening in the motor frame and which is characterized at each rotational speed of the fan and motor by a dominant pure tone. The dominant pure tone of the noise from the fan and motor varies with rotational speed. To silence the noise effectively, the perforated sheet and the air-impermeable sheet that make up the acoustical panel of the silencer are spaced relative to each other and to the outer circumferential surface of the motor frame such that the two sheets define at least part of a resonant cavity. The cavity is tuned to the dominant pure tone generated by the motor when the fan and motor are turning at their maximum normal rotational speeds.

The preferred embodiment of the present invention is constructed to take advantage of two particular characteristics of the noise generated by a multiple speed, direct current motor. One characteristic is the previously mentioned generation of a different noise spectrum dominated by a different pure tone at each different operating speed of the fan and motor. The other characteristic is that as the operating speed of the motor increases, the maximum sound power level emitted from the motor also increases. The maximum sound power level at each different operating speed of the fan and motor is generated at the frequency of the dominant pure tone for that speed. By tuning the silencer as a cavity resonant at the frequency of the dominant pure tone of the greatest normal operating speed of the motor, the highest level of noise generated by the motor will be effectively silenced. The addition of sound absorbing material to the silencer will both extend the effectiveness of the silencer over a broader range of frequencies and degrade the performance of the silencer at the frequency to which the silencer is tuned as a resonant cavity. The result is a silencer that is fairly highly effective at the maximum operating speed of the fan and motor and progressively less effective as the operating speed decreases. Since the maximum sound power level of the noise being produced by the motor also decreases with decreasing operating speed, however, the sound power level of the noise emitted by the motor is reduced to a fairly constant level at all operating speeds through the use of the silencer of the present invention.

BRIEF DESCRIPTION OF THE DRAWINGS

For a better understanding of the invention, reference may be made to the following description of an exemplary embodiment, taken in conjunction with the figures of the accompanying drawings, in which.

DESCRIPTION OF AN EMBODIMENT

Figure 1:
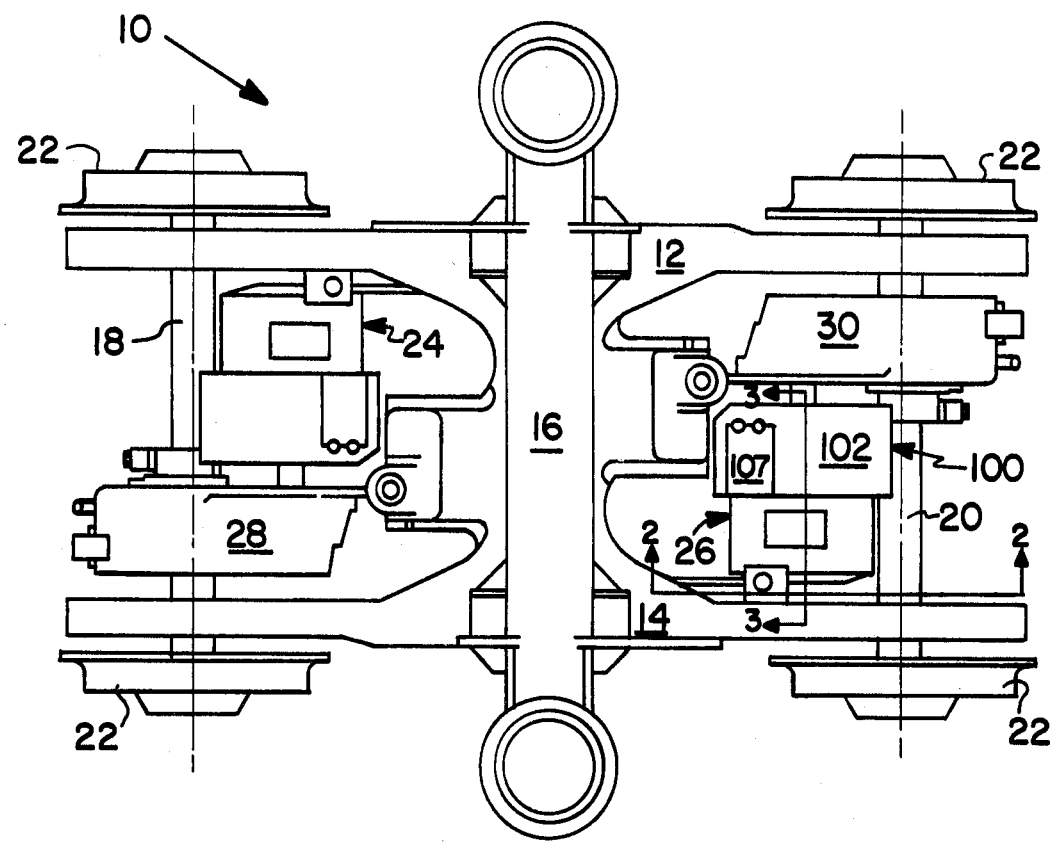
FIG. 1 is a plan view of two silencers according to the present invention mounted on the drive motors for a truck of a transit car.

FIG. 1 of the drawings illustrates, in plan, a truck 10 for a rapid transit vehicle such as a subway car. The truck 10 includes two laterally spaced apart and parallel side frames 12 and 14 joined together by a bolster 16 that extends between the two side frames intermediate their ends. In the illustrated embodiment, the side frames and bolster are formed in one piece of cast steel, but in other constructions the side frames and bolster may be three separate members, for example. Two axles 18 and 20 also extend across the truck 10 between the side frames 12 and 14, one adjacent each end of the truck. Mounted at each end of each axle 18 and 20 and outside the adjacent side frame 12 or 14 is a wheel 22. Between the bolster 16 and each of the axles 18 and 20 is an electric traction motor 24 or 26 and a gear box 28 or 30. Since the motors 24 and 26 are identical in structure and function, as are the gear boxes 28 and 30, the motors and gear boxes will be described with particular reference to the motor 26 and the gear box 30.

Figure 2:
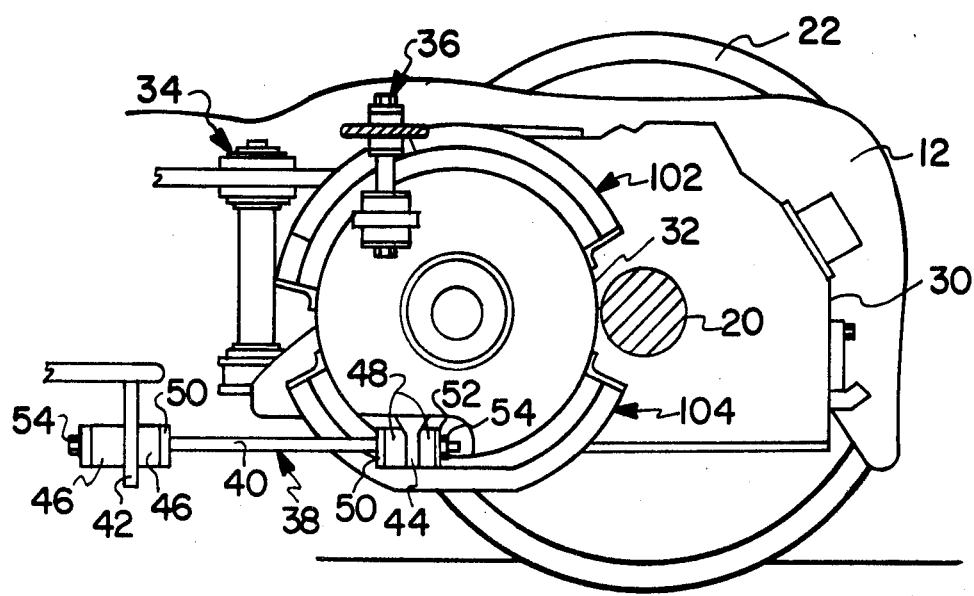
FIG. 2 is an end view of one of the silencers and one of the motors of FIG. 1, taken along line 2—2 of FIG. 1.

The motor 26 has a generally cylindrical motor housing or frame 32 (see FIGS. 2 and 3) and is mounted to extend transversely of the truck 10 and parallel to the bolster 16 and the axle 20. The associated gear box 30 is oriented with its major axis extending parallel to the side frames 12 and 14 and transverse to the longitudinal axis of the motor 26. Adjacent one end, the gear box 30 is connected to the motor 26. Adjacent its other end, the gear box 30 is connected to and supported by the axle 20. The end of the gear box 30 attached to the motor 26 and the adjacent end of the motor are secured to the bolster 16 of the truck 10 by a mounting mechanism 34. The opposite end of the motor 26 is coupled to the truck 10 by mounting mechanisms 36 and 38. The three mounting mechanisms 34, 36, and 38 are generally similar in structure and function and are best shown in FIG. 2. Refering to mechanism 38 as typical of all three, the mechanism includes as elongated metal bar 40 threaded at both ends. The metal bar 40 extends through aligned openings formed in two parallel and spaced apart lugs 42 and 44. The lug 42 is secured to the bolster 16 of the truck 10, while the lug 44 is integral with the frame 32 of the motor 26. On each side of the lug 42, an annular elastomeric mounting element 46 encircles the rod 40. Similar annular elastomeric mounting elements 48 encircle the rod 40 on either side of the lug 44. Flanges 50 are formed on the rod 40 between the lugs 42 and 44 to hold adjacent mounting elements 46 and 48 against movement along the rod 40. On the other side of each of the lugs 42 and 44, a washer 52 encircles a threaded end of the rod 40 and a nut 54 is screwed onto the threaded end of the rod. The nuts 54 and washers 52 hold the entire mounting mechanism 38 in place. The threaded rod 40 of the mounting mechanism 38 is horizontally aligned, while the corresponding rods of mounting mechanisms 34 and 36 are vertically aligned. The lugs of mechanisms 34 and 36 which correspond to the lug 42 are secured to the bolster 16 and to the side frame 14 of the truck 10, respectively.

Figure 3:
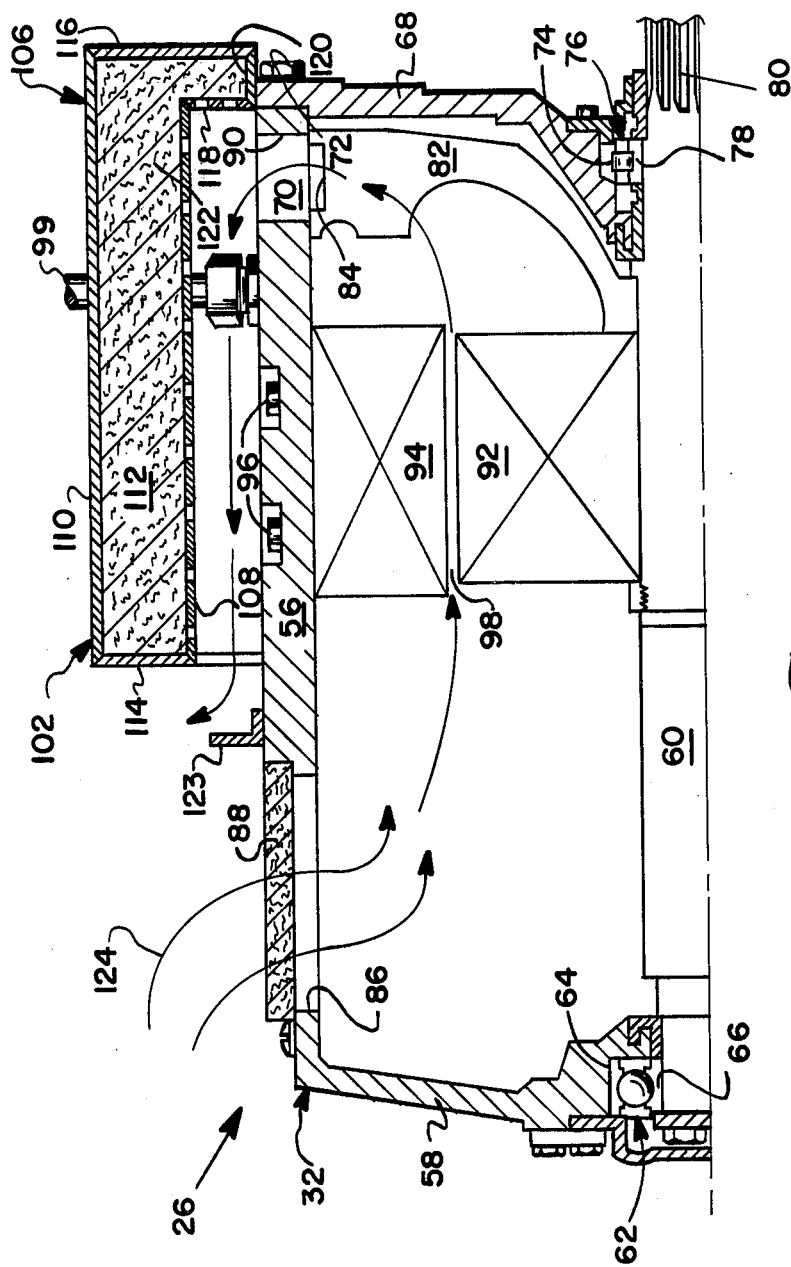
FIG. 3 is a side sectional view of the silencer and electric motor of FIG. 2, taken along line 3—3 of FIG. 1.

FIG. 3 of the drawings shows the upper half of the motor 26 in section and on an enlarged scale. As previously indicated, the motor 26 includes a generally cylindrical motor frame or housing 32 that encloses most of the other components of the motor. The frame 32 includes a tubular main body portion 56 and a flange 58 that is formed in one piece with one end of the body portion. The flange 58 is annular in shape and extends radially inwardly from the end of the body portion 56 of the housing 32 toward a shaft 60 that extends lengthwise through the motor 26. Interposed between the radially inner circumference of the flange 58 and the outer circumference of the adjacent end of the shaft 60 is a ball bearing assembly 62. The outer race 64 of the bearing 62 is disposed adjacent to the interior circumferential surface of the flange 58 and is held against movement axially or longitudinally of the frame 32. In a similar manner, the radially inner race 66 of the ball bearing 62 is mounted on the shaft 60 so as not to move axially of the shaft 60. The bearing assembly 62 permits the shaft 60 to rotate freely relative to the flange 58 of the motor housing 32.

Adjacent the end of the main body portion 56 of the motor frame 32 opposite the flange 58 is an annular flange plate 68. The flange plate 68 is spaced axially from the end of the main body portion 56 of the frame 32 and extends radially inwardly relative to the main body portion toward the shaft 60. The flange plate 68 is joined to and spaced from the main body portion 56 of the frame 32 about its periphery by a plurality of circumferentially spaced apart ribs 70. The ribs 70 are integral with and extend axially from the end of the main body portion 56 of the motor frame 32. Axially extending, threaded bores are formed in the ribs 70 to receive the threaded ends of lug bolts 72. The bolts 72 pass through openings circumferentially spaced apart about the outer periphery of the flange plate 68 and are screwed into the threaded bores to hold the flange plate in place relative to the main body portion 56 of the motor frame 32. Along its radially inner circumference, the flange plate 68 engages the radially outer race 74 of a roller bearing 76. The race 74 is held against axial or longitudinal movement relative to the flange plate 68. The radially inner race 78 of the bearing 76 is mounted and held axially in place on the shaft 60 adjacent the shaft end 80 opposite the end that mounts the ball bearing 62. The end 80 of the shaft 60 is splined and extends beyond the roller bearing 76 and the flange plate 68 to engage an appropriate member (not shown) in the gear box 30.

Inside the motor frame 32 immediately adjacent the flange plate 68, several radially extending fan blades 82 are mounted on the shaft 60 to rotate with the shaft. The radially outermost end 84 of each fan blade 82 lies adjacent the ribs 70 that join the flange plate 68 to the main body portion 56 of the frame 32. The width of the radially outermost end 84 of each blade 82 is about equal to the length of each rib 70. To enable air to reach the fan blades 82, a section of the main body portion 56 of the frame 32 adjacent the flange 58 is omitted to form an inlet opening 86 into the interior of the motor 26. An air-permeable filter 88 prevents contaminants from entering the motor 26 through the inlet 86. As can be seen in FIG. 3, the circumferential spacing between the ribs 70 provides a plurality of outlet openings 90 in the motor frame 32 to permit air to flow from the fan blades 82.

Also mounted on the shaft 60 and disposed between the fan blades 82 and the ball bearing 62 is the rotor 92 of the electric motor 26. Spaced closely to the rotor 92 and mounted on the interior circumferential surface of the main body portion 56 of the frame 32 is an annular stator 94. The stator 94 is secured to the frame 32 by lug bolts 96. the bolts 96 extend from the outside of the main body portion 56 of the frame 32 into threaded bores formed in the stator 94. A narrow annular gap 98 between the rotor 92 and the stator 94 provides a space through which air may flow to cool the interior of the motor 26. The electrical current to operate the motor 26 is conducted to the motor by electrical leads 99 that pass through the main body portion 56 of the frame 32.

To attenuate noise that is generated by the fan blades 82 and the related flow of air, as will be explained hereinafter, a silencer 100 partially encircles the motor frame 32 adjacent the end of the frame at which the fan blades are located. As best shown in FIG. 2, the silencer 100 includes two arcuate silencer halves 102 and 104 of similar construction. Looking to the silencer half 102 shown in FIG. 3, it can be seen that the primary component of the silencer half is an arcuate and elongated main acoustical panel member 106. The main panel member 106 extends from adjacent the flange plate 68 of the motor frame 32 to the edge of the inlet opening 86 formed in the motor frame adjacent its other end. The curvature of the main acoustical panel 106 is such as to be coaxial with the curvature of the main body portion 56 of the motor frame 32. The radii of curvature are sufficiently different, however, that a space occurs between the outer circumferential surface of the frame 32 and the inner circumferential surface of the acoustical panel 106. As best shown in FIG. 1, the silencer half 102 includes a removable subsection 107 that is releasably secured to the remainder of the silencer half. The subsection 107 permits the silencer half to be installed on and removed from the motor 26 without having to disconnect the electrical leads 99.

The main panel member 106 of the silencer half 102 comprises an arcuate, perforated sheet of galvanized steel 108 that is presented to the exterior circumferential surface of the main body portion 56 of the motor frame 32. Spaced from the perforated sheet 108 and parallel to it is a longer, solid sheet of steel 110. The sheet 110 may be galvanized steel or painted cold-rolled steel. A layer of mineral wool 112, which is permeable to air, is disposed between the sheets 108 and 110 to act as sound absorbing material. The sheets 108 and 110 are joined together at one end of the silencer half 102 by an annular flange 114 that extends radially of both sheets. The flange 114 is solid galvanized steel sheet and may be fabricated in one piece with the sheet 110. The flange 114 may also be a separate element, as shown in FIG. 3, which is welded or otherwise secured to both sheets 108 and 110. As best shown in FIG. 2, the longitudinal edges of the panel 106 are formed of turned down portions of the sheet 110. The turned down portions of the sheet 110 are also bent to form flanges to secure the silencer half 102 to the motor frame 32. Screws (not shown) pass through holes in the flanges formed by the sheet 110 and are screwed into threaded bores in the motor frame.

At the end of the silencer half 102 opposite the flange 114 is a similar flange 116. The flange 116, however, extends from the outer, impermeable steel sheet 110 to a point approximately even with the exterior circumferential surface of the flange plate 68 of the motor frame 32. Spaced from and parallel to the flange 116 is a flange 118 of perforated steel sheet. The perforated flange 118 extends from adjacent the exterior circumferential surface of the motor frame 32 radially outwardly until it meets the perforated sheet 108. The radial flanges 116 and 118 are joined by an axially extending annular metal strip 120 that is contiguous with the motor frame 32. The space between the perforated flange 118 and the solid flange 116 is filled with sound absorbing material 122 so as to form a radially extending acoustical panel. The result is a barrier-like element that completely blocks off the space between the main panel member 106 of the silencer half 102 and the motor frame 32 at one end. Thus, if any air flows out of the outlet openings 90 in the motor frame 32, the air must flow along the length of the motor frame between the silencer half 102 and the exterior circumferential surface of the motor frame toward the inlet opening 86. To prevent heated air from the silencer 100 from being immediately drawn back into the inlet opening 86, an annular baffle 123 is welded to and extends radially outwardly from the motor frame 32 between the inlet opening and the adjacent end of the silencer.

In operation of the motor 26, a direct electric current is transmitted to the motor through the electrical leads 99. The direct current tends to cause the rotor 92 to move relative to the stator 94. The force acting on the rotor 92 drives the shaft 60, on which the rotor is mounted, to rotate in the frame 32 on the ball bearing 62 and the roller bearing 76. As the shaft 60 rotates, the fan blades 82 also rotate. The rotating fan blades 82 draw air in through the filter 88 and the inlet opening 86 in the motor frame, as generally indicated by arrows 124. The air from the inlet opening 86 flows through the interior of the motor frame 32 and between the rotor 92 and the stator 94 to the fan blades 82. During its flow through the interior of the motor frame 32, the air cools the interior of the motor 26. Air that reaches the fan blades 82 is exhausted in a radially outwardly direction through the outlet openings 90. As the fan blades 82 rotate to exhaust air from the motor frame 32, the blades move in close proximity past the ribs 70 of the motor frame. The air that is being exhausted by the fan blades 82 is compressed between the radially outward ends 84 of the blades 82 and the adjacent surfaces of the ribs 70. The compression of the air produces a fairly continuous and often high pitched whine that resembles a siren, for example. The whine produced by the motor 26 is audible almost continuously while the motor is in operation.

Figure 4:
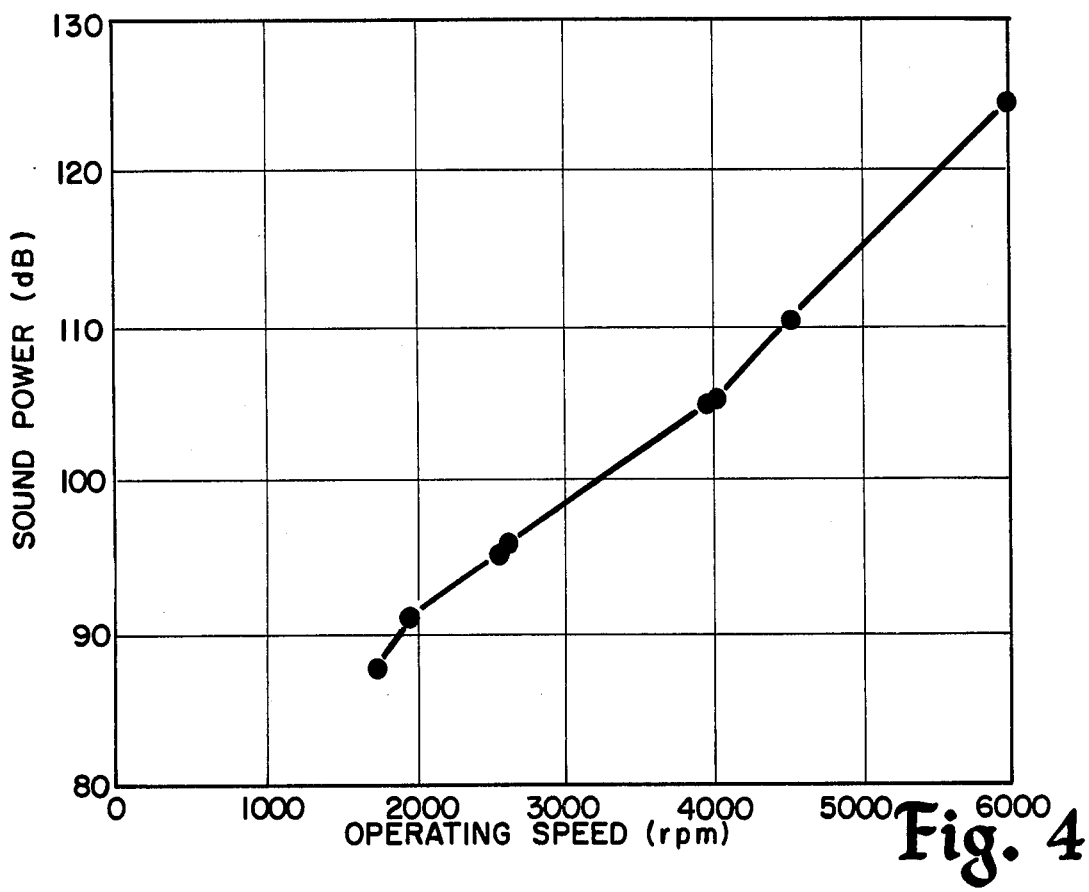
FIG. 4 is a graphical representation of the sound power levels generated by the motor of FIGS. 2 and 3 at various operating speeds.

It has been found that the noise produced by the compression of air between the ribs 70 of the motor frame 32 and the radially outermost ends 84 of the fan blades 82 is characterized by a single dominant tone at each operating speed of the motor 26 and the fan blades. Th dominant pure tone characteristic is illustrated by the solid line or curve 126 in FIG. 5. The line or curve 126 represents the noise spectrum for a motor similar to the motor 26 when operating at a rotational speed of about 4,000 revolutions per minute. The curve 126 is characterized by a single major peak 128 which is located at about 830 hertz and which represents a noise level of about 105 decibels. The peak 128 represents a pure tone that dominates the noise spectrum. On either side of the peak 128, the noise level drops off rapidly and substantially. As is suggested by the dashed curve 130 in FIG. 5, a dominant pure tone such as that represented by the peak 128 of the curve 126 will occur at other frequencies, depending upon the rotational speed of the motor 26 and the fan blades 82. The curve 130 represents a projected noise spectrum for the same motor when operating at about 6,000 rpm. The dominant pure tone peak 132 of the curve 130 occurs at 1245 hertz and 125 decibels. The directly proportional relationship between the maximum sound power level generated by the motor 26 and the rotational speed of the motor is shown in FIG. 4. The maximum noise or sound power levels represented by the discrete points on the curve of FIG. 4 were measured at a distance of fifteen feet from the motor. As suggested by FIG. 5, the maximum sound power level at each operating speed occurs at the frequency of the dominant pure tone of the noise spectrum for the operating speed.

The noise characteristics of a direct current motor, such as the motor 26 shown in FIGS. 1 to 3, which are discussed in the preceding paragraph present a problem in terms of attempting to silence the motor. Rather than generating a relatively constant level of noise throughout all frequencies and all speed ranges, the motor 26 generates noise at power levels that vary with the rotational speed of the motor. For each different operating speed, there is also a different dominant frequency at which the sound power level is much greater than at any other frequency. One approach for attenuating the noise generated by the motor 26 might be to provide a device with a series of resonant cavities, each tuned to a different frequency. Such as solution would, of course, be too bulky to be feasible. Another approach, which has been tried and is used on the motor 26, is to space the fan blades 82 circumferentially in an irregular manner about the shaft 60 on which the blades are mounted. The irregular spacing technique does tend to spread the sound power over additional frequencies, as represented by the two "knees" 134 and 136 in the curve 126. Nonetheless, irregular spacing of the fan blades 82 does not provide an especially effective solution to the problem.

Figure 5:
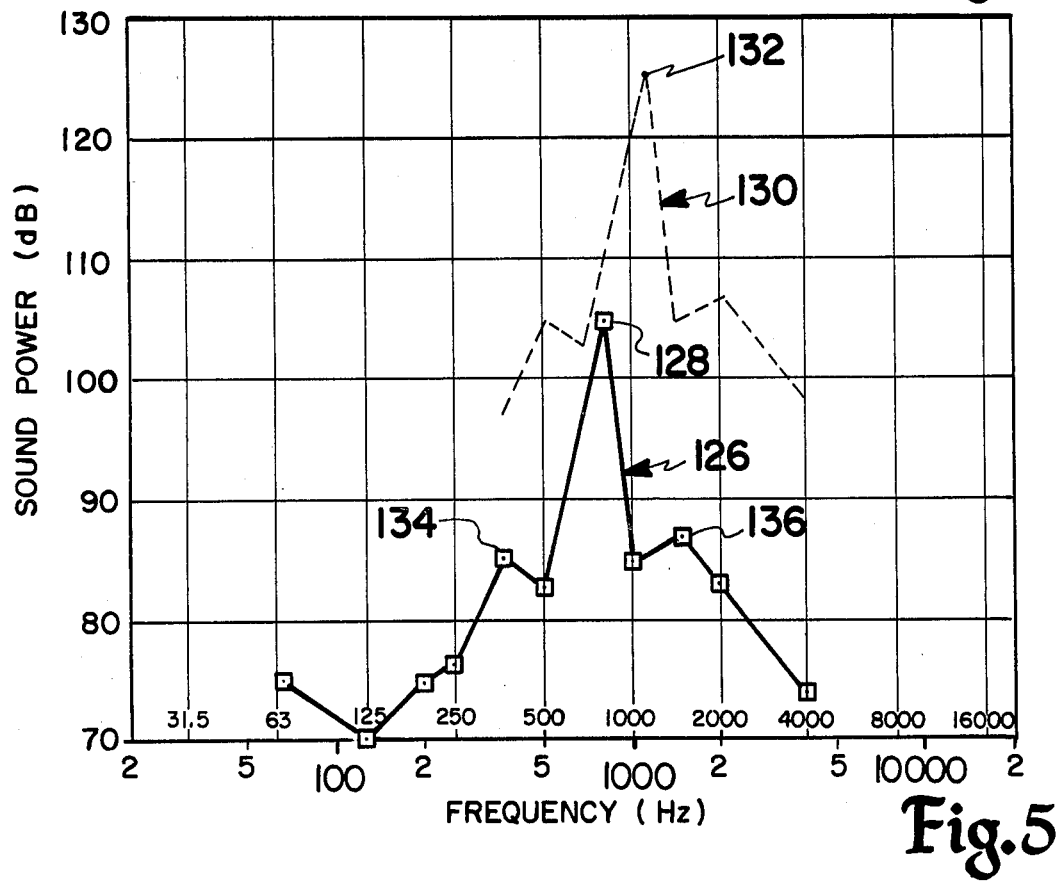
FIG. 5 is a graphical representation of the noise spectra generated by the motor of FIGS. 2 and 3.

The silencer 100 of the present invention is intentionally designed to provide a resonant cavity between its perforated members, such as sheet 108, and its impermeable members, such as sheet 110. The resonant cavity or cavities so formed are all tuned, subject to space limitations, to attenuate sound at a single predetermined frequency. The frequency selected is the frequency of the dominant pure tone of the noise spectrum generated at the highest or maximum operating speed of the motor 26 under normal conditions. The tuning of the silencer 100, which involves selecting the spacing between the sheet 108, for example, and both the sheet 110 and the outer surface of the motor frame 32, is done in accordance with design criteria such as those set out in the article entitled "Theoretical Analyses of Sound Attenuation in Acoustically Lined Flow Ducts Separated By Porous Splitters (Rectangular, Annular and Circular Ducts)" prepared by S. H. Ko and published in the *Journal of Sound and Vibration* (1975) at pages 471 to 487. Tuning the resonant cavity defined between the sheets 108 and 110, for example, will provide very effective attenuation of noise generated at the maximum operating speed of the motor 26. In order to attenuate noise at other operating speeds of the motor 26, the space between the sheet 108 and 110, for example, is filled with sound absorbing material, such as mineral wool 112, that is placed and packed in accordance with the general principles set out in the previously mentioned article in the *Journal of Sound and Vibration*. The effect of the porous sound absorbing material is to diminish the effectiveness of the silencer 100 at the frequency of the dominant pure tone of the highest operating speed at which the motor 26 will turn. On the other hand, the sound absorbing material will also afford noise attenuation at frequencies above and below the frequency to which the cavity of the silencer 100 is tuned, but to progressively decreasing degrees. As a result, the silencer 100 will be most effective at the frequency of the dominant pure tone of the highest operating speed of the motor 26 and will be effective to an extent that decreases with both increasing and decreasing frequency at not too steep a rate for frequencies above and below the frequency for which the silencer is tuned. The decrease in effectiveness of the silencer 100 with decreasing and increasing frequency, when filled with sound absorbing material, is more gradual than the decrease in effectiveness of the silencer's resonant cavity alone with decreasing and increasing frequency. Because both the maximum sound power levels generated by the motor 26 and the dominant frequencies of the maximum sound power levels decrease at a fairly rapid rate with decreasing operating speed, as shown in FIGS. 4 and 5, the functional characteristics of the silencer 100 result in a silencer that is effective over most of the operating speed range of the motor 26.

As explained above, the silencer 100 operates as a resonant cavity for the dominant pure tone of the highest operating speed of the motor 26, and otherwise acts as a dissipative silencer or absorber with respect to sound that travels along the outer surface of the motor frame 32 between the motor frame and the panel member 106. The effectiveness of the silencer 100 as a sound absorber is improved by having the air and airborne noise that is exhaused by the fan blades 82 flow toward the main acoustical panel member 106 adjacent the outlet openings 90 in the motor frame 32. At least part of the airborne noise will thus be carried through the perforated sheet 108 directly into the sound absorbing material 112. The sound absorption of the silencer 100 is also improved by the generally smooth outer circumferential surface of the main body portion 56 of the motor frame 32. The smoothness of the surface of the motor frame 32 permits the air and airborne noise exhausted by the fan blades 82 to travel naturally in a spiral about the motor frame between the outer circumferential surface of the frame and the main acoustical panel 106 of the silencer 100. As a result, the effective length of the silencer 100 is increased, with respect to airborne noise from the motor, as compared to a silencer through which air flows in a generally straight path.

The silencer 100 will, to some extent, restrict the flow of air from the motor 26. Nonetheless, the reduction in air flow is acceptable in view of the compact size and shape of the silencer 100, which minimizes the increase in the outer dimensions of the motor 26. The need to minimize the space occupied by the silencer 100 is dictated by the limited clearances provided between the motor 26 and the adjacent portions of the transit car body, the transit car truck, and the road bed. Space limitations require the bottom portion of the lower silencer half 104 to be flattened, rather than arcuate. The resulting resonant cavity defined by the flattened portion of the silencer half 104 is not tuned to precisely the same frequency as the rest of the absorber. Nonetheless, the frequency to which the flattened portion of the lower silencer half 104 is tuned is as close as possible to the frequency of the dominant pure tone at the highest operating speed of the motor. Space limitations, such as the need for axle clearance, also require the silencer to be in two halves 102 and 104.

It will be understood that the embodiment described above is merely exemplary and that persons skilled in the art may make many variations and modifications without departing from the spirit and scope of the invention. Such modifications may include variations in the thicknesses of the layers of sound absorbing material 112 and 122, the use of different type of sound absorbing material, the use of polyethylene bags to protect the sound absorbing material against contamination, and changes in the thicknesses of and the materials used in the various sheets of the silencer. All such modifications and variations are intended to be within the scope of the invention as defined in the appended claims.

What is claimed is:

1. In a direct current electric motor that normally operates at any one of a plurality of rotational speeds up to a predetermined maximum rotational speed, the motor including a motor frame, means defining a fan disposed adjacent one end of and inside the motor frame, the fan being driven by the motor, means defining in the motor frame an inlet opening for air adjacent the other end of the motor frame, and means defining in the motor frame an outlet opening for air which is disposed adjacent to and in radial alignment with the fan, air being drawn by the fan in through the inlet opening and over motor components inside the motor frame and being exhausted by the fan in a radially outward direction through the outlet opening, the motor generating noise which travels with the air exhausted by the fan through the outlet opening and which is characterized at each of a plurality of rotational speeds of the fan and motor by a different dominant pure tone associated with said each rotational speed, the dominant pure tones decreasing in frequency with decreasing rotational speed, the improvement of a silencer comprising acoustical panel means at least partially surrounding the motor frame, the panel means being spaced from the motor frame and disposed to intercept air and noise flowing radially from the fan and the outlet opening, the panel means extending from adjacent the one end of the motor frame at least partway along the length of the frame toward the other end of the frame so as to direct air exhausted from the fan along the length of the motor frame between the frame and the panel means, the acoustical panel means including a layer of air-permeable sound absorbing material, an air-impermeable sheet disposed adjacent to the sound absorbing material on a side thereof opposite the motor frame, and a perforate sheet disposed between the sound absorbing material and the motor frame, the perforate sheet and the air-impermeable sheet being spaced relative to each other and to the motor frame such that the two sheets define at least part of a resonant cavity which at least partly surrounds the motor frame and is tuned to the frequency of the dominant pure tone of the noise generated by the motor at its predetermined maximum rotational speed, the resonant cavity causing the silencer to be most effective at the frequency of the dominant pure tone to which the cavity is tuned and the sound absorbing material causing the silencer to be effective at other frequencies to an extent that progressively decreases with decreasing frequency and decreasing rotational speed of the motor, the decrease in effectiveness of the silencer with decreasing frequency being more gradual than the decrease in effectiveness of the resonant cavity alone with decreasing frequency.

2. An electric motor, according to claim 1, wherein the silencer also comprises barrier means disposed at the one end of the motor frame and extending between the motor frame and the acoustical panel means so as to block air and noise exhausted through the outlet opening from flowing out from between the acoustical panel and the motor frame in a direction along the motor frame away from both the outlet opening and the inlet opening.

3. An electric motor, according to claim 2, wherein the barrier means is integral with the acoustical panel means and includes a layer of air-permeable sound absorbing material, an air-impermeable sheet disposed adjacent to the sound absorbing material on a side thereof opposite the outlet opening in the motor frame, and a perforate sheet disposed between the sound absorbing material and the outlet opening.

4. An electric motor, according to claim 1, wherein the motor frame is generally cylindrical in shape and wherein the acoustical panel means includes two separate acoustical panel sections disposed opposite each other, each acoustical panel section extending along the length of the motor frame and including a layer of air-permeable sound absorbing material disposed between an air-impermeable sheet and a perforate sheet.

5. An electric motor, according to claim 4, wherein each acoustical panel section is attached to the motor frame.

6. An electric motor, according to claim 4, wherein at least one of the acoustical panel sections includes at least two separable panel subsections.

* * * * *